(12) United States Patent
Yu et al.

(10) Patent No.: US 8,200,917 B2
(45) Date of Patent: Jun. 12, 2012

(54) MULTI-MEDIA PROCESSOR CACHE WITH CACHE LINE LOCKING AND UNLOCKING

(75) Inventors: Chun Yu, San Diego, CA (US); Guofang Jiao, San Diego, CA (US); Jian Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 917 days.

(21) Appl. No.: 11/862,063

(22) Filed: Sep. 26, 2007

(65) Prior Publication Data

US 2009/0083497 A1 Mar. 26, 2009

(51) Int. Cl.
*G06F 12/14* (2006.01)

(52) U.S. Cl. ........ 711/155; 711/114; 711/118; 711/147; 711/150; 711/152

(58) Field of Classification Search .................. 711/114, 711/118, 147, 150, 152, 155
See application file for complete search history.

(56) References Cited

U.S. PATENT DOCUMENTS

| 5,263,161 | A | | 11/1993 | Barth et al. | |
|---|---|---|---|---|---|
| 5,430,860 | A | * | 7/1995 | Capps et al. | 711/155 |
| 5,701,432 | A | * | 12/1997 | Wong et al. | 711/130 |
| 5,781,926 | A | * | 7/1998 | Gaskins et al. | 711/145 |
| 6,006,299 | A | * | 12/1999 | Wang et al. | 710/108 |
| 6,259,460 | B1 | | 7/2001 | Gossett et al. | |
| 6,370,625 | B1 | * | 4/2002 | Carmean et al. | 711/152 |
| 6,397,306 | B2 | * | 5/2002 | Ciavaglia et al. | 711/148 |
| 6,498,605 | B2 | * | 12/2002 | Abdallah | 345/422 |
| 7,020,743 | B2 | * | 3/2006 | Lee et al. | 711/113 |
| 7,266,648 | B2 | * | 9/2007 | Sutanto et al. | 711/145 |
| 7,650,605 | B2 | * | 1/2010 | Melvin et al. | 718/104 |

FOREIGN PATENT DOCUMENTS

EP 0381325 A2 8/1990

OTHER PUBLICATIONS

European Search Report—EP08006442, Search Authority—The Hague Patent Office, Dec. 11, 2008.
International Search Report and Written Opinion—PCT/US2008/078009, International Searching Authority—European Patent Office, Dec. 23, 2008.

* cited by examiner

*Primary Examiner* — Sanjiv Shah
*Assistant Examiner* — Samuel Dillon
(74) *Attorney, Agent, or Firm* — Matthew J. Evans; James R. Gambale, Jr.

(57) ABSTRACT

The disclosure relates to techniques for locking and unlocking cache lines in a cache included within a multi-media processor that performs read-modify-write functions using batch read and write requests for data stored in either an external memory or an embedded memory. The techniques may comprise receiving a read request in a batch of read requests for data included in a section of a cache line and setting a lock bit associated with the section in response to the read request. When the lock bit is set, additional read requests in the batch of read requests are unable to access data in that section of the cache line. The lock bit may be unset in response to a write request in a batch of write requests to update the data previously read out from that section of the cache line.

25 Claims, 7 Drawing Sheets

MULTI-MEDIA PROCESSOR CACHE WITH CACHE LINE LOCKING AND UNLOCKING

TECHNICAL FIELD

This disclosure relates to caches and, more particularly, techniques for managing caches within multi-media processors.

BACKGROUND

A multi-media processor may include a central processing unit (CPU), a graphics processing unit (GPU), a video processing unit, a still-image processing unit, and an audio processing unit. For example, a GPU is a dedicated graphics rendering device utilized to manipulate and display computerized graphics on a display. GPUs are built with a highly parallel structure that provides more efficient processing than typical, general-purpose CPUs for a range of complex graphic-related algorithms. For example, the complex algorithms may correspond to representations of three-dimensional computerized graphics. A GPU may implement a number of so-called "primitive" graphics operations, such as operations that form points, lines, and triangles, to create complex, three-dimensional images on a display more quickly than drawing the images directly to the display with a CPU. GPUs may be used in a wide variety of applications, and are very common in graphic-intensive applications, such as video gaming.

GPUs typically include a number of pipeline stages such as one or more shader stages, setup stages, rasterizer stages, and interpolation stages. At each of these stages, a GPU may utilize data stored in an external, i.e., off-chip, memory. For example, after primitive shapes formed within the image data are converted into pixels by a rasterizer stage, pixel rejection may be performed to eliminate those portions of the primitive shapes that are hidden in an image frame. The pixel rejection may be performed based on a pixel depth value comparison between a depth value that has been interpolated for a given pixel and a recorded depth value corresponding to that pixel that is fetched from either an external memory or an embedded memory. If the comparison function returns true, which means that the interpolated depth value is less than (i.e., in front of) the recorded depth value, then the interpolated depth value of the pixel should be written to the memory. If the function returns false, which means that the interpolated depth value is greater than (i.e., behind) the recorded depth value, the recorded depth value of the pixel should remain unchanged and processing of that pixel is halted immediately.

At processing stages that perform read-modify-write functions using data stored in either an external memory or an embedded memory, a multi-media processor repeatedly accesses the memory to perform a data value read from the memory, followed by an updated data value write to the memory. Frequently performing memory accesses causes the multi-media processor to consume large amounts of power and access bandwidth. In order to reduce consumption levels, a multi-media processor may include at least one cache that stores copies of data at frequently used memory locations in a memory. In this way, the multi-media processor may reduce the number of memory accesses by performing data value write and read operations to and from the local cache.

SUMMARY

In general, the disclosure relates to techniques for locking and unlocking cache lines in a cache included within a multi-media processor. The techniques may be used by processors that perform read-modify-write functions using batch read and write requests for data stored in either an external memory or an embedded memory. The techniques described herein may comprise receiving a read request in a batch of read requests for data included in a section of a cache line and setting a lock bit associated with the section of the cache line in response to the read request. When the lock bit associated with the section of the cache line is set, additional read requests in the batch of read requests are unable to access data included in that section of the cache line. The lock bit may be unset in response to a write request in a set of write requests to update the data previously read out from that section of the cache line. If a read request for data included in the locked section of the cache line is received, the read request may be held in a buffer and processed once the lock bit of the section is unset.

The cache line locking and unlocking techniques may improve performance of the multi-media processor by reducing accesses to a memory (e.g., external or embedded) relative to a conventional cache arrangement, which saves power and access bandwidth. For example, the techniques reduce or eliminate unnecessary cache line threshing in which a subsequent read request evicts a cache line before previously read out data included in the cache line can be updated. Locking the cache lines between read requests in the batch of read requests and associated write requests in the batch of write requests ensures that those cache lines including previously read out data will remain in the cache until the data is updated by a write request. In this way, the write requests to update data included in the cache lines trigger cache write hits. Therefore, the multi-media processor may not need to perform a hit or miss determination within the cache and may not need to fetch a cache line from the memory during a write process.

As another example, the cache line locking and unlocking techniques naturally assure that multiple read and write requests for the same data within a cache line are processed in the correct order. Locking access to the cache line ensures that a subsequent read request cannot be processed until a write request associated with a previous read request updates the data and unlocks the cache line. In this way, subsequent read requests for the same data will return accurate information to the multi-media processor.

In one example, the cache line locking and unlocking techniques may be implemented within a graphics processing unit (GPU). For example, at a hidden primitive and pixel rejection stage, the GPU may perform a pixel depth comparison function to determine which of the pixels are hidden in an image frame and may be rejected. The pixel rejection may be performed based on a comparison between a depth value that has been interpolated for a given pixel and a recorded depth value corresponding to that pixel that is fetched from the memory via the cache. The pixel depth comparison function typically triggers a pixel depth value read, followed by a pixel depth value write for each pixel in the image frame. As another example, at a post processor stage, the GPU may perform a color function with alpha blending to determine the resultant color at a pixel included in overlapping primitives. Locking the cache lines between read requests in the batch of read requests and associated write requests in the batch of write requests avoids unnecessary cache line threshing and ensures that overlapping primitives are processed in the correct order.

In one aspect, the disclosure is directed to a method comprising receiving a read request in a batch of read requests for a read-modify-write function, wherein the read request requests data at a memory location in a memory, identifying a cache line in a cache storing a copy of the requested data, and determining whether the cache line is locked. When the cache line is not locked, the method further comprises processing the read request and locking the cache line to accesses by additional read requests in the batch of read requests. When the cache line is locked, the method further comprises holding the read request until the cache line is unlocked.

In another aspect, the disclosure is directed to a processing unit comprising a cache including cache lines that store content of memory locations of a memory, a processing pipeline that sends a read request in a batch of read requests, wherein the read request requests data at a memory location in the memory, and a cache controller coupled to the processing pipeline and the cache. The cache controller identifies a cache line in the cache storing a copy of the requested data and determines whether the cache line is locked. When the cache line is not locked, the cache processes the read request and the cache controller locks the cache line to accesses by additional read requests in the batch of read requests. When the cache line is locked, the cache controller holds the read request until the cache line is unlocked.

In another aspect, the disclosure is directed to a computer-readable medium that comprises instructions. The instructions cause a computer to receive a read request in a batch of read requests for a read-modify-write function, wherein the read request requests data at a memory location in a memory, identify a cache line in a cache storing a copy of the requested data, and determine whether the cache line is locked. When the cache line is not locked, the instructions cause the computer to process the read request and lock the cache line to accesses by additional read requests in the batch of read requests. When the cache line is locked, the instructions cause the computer to hold the read request until the cache line is unlocked.

In a further aspect, the disclosure is directed to an apparatus comprising means for caching content of memory locations of a memory, means for sending a read request in a batch of read requests, wherein the read request requests data at a memory location in the memory, and means for controlling the means for caching by identifying a cache line in the means for caching that stores a copy of the requested data and determining whether the cache line is locked. When the cache line is not locked, the means for caching processes the read request and the means for controlling locks the cache line to accesses by additional read requests in the batch of read requests. When the cache line is locked, the means for controlling holds the read request until the cache line is unlocked.

The techniques described in this disclosure may be implemented in hardware, software, firmware, or any combination thereof. If implemented in software, the software may be executed in a computer. The software may be initially stored on a computer-readable medium as instructions, program code, or the like. Accordingly, the disclosure also contemplates a computer-readable medium comprising instructions that cause a computer to execute techniques and functions according to this disclosure. In some cases, the computer readable medium may be included in a computer program product, which may include packaging materials. Alternatively, if implemented in hardware, such hardware implementations may be digital, analog or both.

Additional details of various examples are set forth in the accompanying drawings and the description below. Other features, objects, advantages and examples will become apparent from the description and drawings, and from the claims.

DETAILED DESCRIPTION

Figure 1:
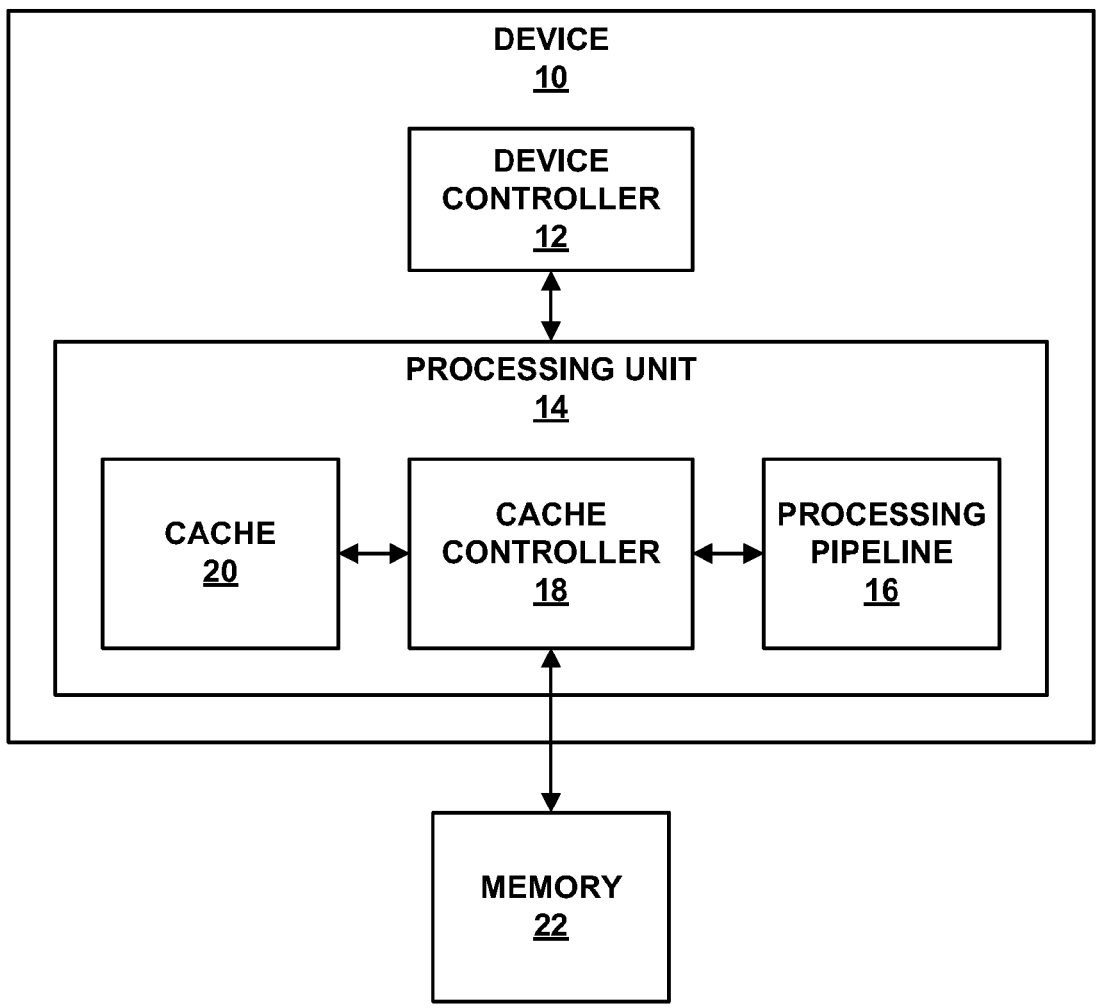
FIG. 1 is a block diagram illustrating an exemplary device including a processing unit that includes a processing pipeline and a cache coupled to the processing pipeline via a cache controller for local memory access.

FIG. 1 is a block diagram illustrating an exemplary device 10 including a processing unit 14 that includes a processing pipeline 16 and a cache 20 coupled to processing pipeline 16 via cache controller 18. Cache 20 includes cache lines that store content of memory locations of a memory 22 to reduce the number of memory accesses to memory 22 by processing unit 14. Memory 22 may comprise an external memory positioned off-chip from device 10 or an embedded memory positioned on-chip with device 10. According to this disclosure, cache controller 18 implements techniques for locking and unlocking cache lines in cache 20 to improve performance of processing unit 14 and device 10 by reducing accesses to memory 22 when compared with a conventional cache arrangement, which saves power and access bandwidth.

The cache line locking and unlocking techniques may be especially useful when processing pipeline 16 performs read-modify-write functions using batch read and write requests for data at a memory location in memory 22. Locking the cache lines between read requests in the batch of read requests and associated write requests in the batch of write requests ensures that those cache lines including previously read out data will remain in cache 20 until the data is updated by a write request. In this way, the write requests to update data included in the cache lines trigger cache write hits.

In the example of FIG. 1, device 10 includes a device controller 12 capable of controlling operation of device 10 and processing unit 14. Processing unit 14 may comprise a multi-media processor, such as a central processing unit (CPU), graphics processing unit (GPU), a video processing unit, a still-image processing unit, an audio processing unit, or any other processor capable of processing image data and/or audio data.

Processing unit 14 receives data from device controller 12 within device 10. The data may correspond to image data, including two-dimensional or three-dimensional computerized graphics and still images, video data, audio data, or other multi-media data. Processing unit 14 then processes the data for presentation to a user of device 10 via an output device, such as a display or speakers. In some cases, device controller 12 may receive the data from applications operating within device 10. In other cases, device controller 12 may receive the image data from applications operating external to device 10. In this case, the data may be received via streaming media or broadcast media, which may be wired, wireless or a combination of both.

As one example, device 10 may comprise a server or other computing device of a wireless communication service provider that communicates with wireless communication devices, such as mobile radiotelephones, satellite radiotelephones, portable computers with wireless communication card, personal digital assistants (PDAs) equipped with wireless communication capabilities, or any of a variety of devices capable of wireless communication. As another example, device 10 may comprise a server or other computing device connected to a wired communication device or a device not principally directed to communication via a wired network. In other examples, device 10 may comprise a wireless communication device, a desktop or notebook computer, or another device ancillary (i.e., not principally) directed to communication.

Processing pipeline 16 within processing unit 14 may utilize data stored in memory 22 when processing the data received from device controller 12. At various processing stages within processing pipeline 16 that perform read-modify-write functions using data stored in memory 22, processing pipeline 16 sends batch requests for the data to cache controller 18 to determine whether the requested data is currently stored in cache 20. Processing pipeline 16 repeatedly accesses memory 22 via cache 20 to perform a data value read from memory 22, followed by an updated data value write to memory 22.

If cache 20 always processed data read and write requests for a read-modify-write function in the order read data 0, write data 0, read data 1, write data 1, . . . read data n, write data n, the write requests would trigger cache write hits in cache 20 as any write operation always updates the same data of its previous read request. However, in this sequence, the write process strictly depends on the previous read process and if the read process results a cache read miss, the write process has to wait until the read data been returned from memory 22. In order to unroll this dependency and to cover the long read latency, cache 20 batch processes as many read requests as possible before it switches to batch process as many write requests as possible for a read-modify-write function. The sequence is then changed to read data 0, read data 1, . . . read data n, write data 0, write data 1, . . . write data n.

In a conventional cache with the batch read/write sequence, before the "write data 0" process occurs following the "read data 0" process, some other read request in the batch of read requests could thresh out the cache line that includes the requested data 0. If that cache line is threshed out, a cache write miss may happen when the "write data 0" request in the batch of write requests is processed. Moreover, in order to process a read-modify-write function when the write request only updates the cache line partially, the cache write miss triggers fetching the entire cache line from memory 22. This situation increases the access bandwidth consumption and introduces serious stalling in processing pipeline 16 due to the round-trip memory read latency.

In some cases, it is possible for two different read-modify-write functions within processing pipeline 16 to access the same data within a short time. Typically, rendering order must be maintained during the processing stages such that processing the second first read-modify-write function should not occur until the result of processing the first read-modify-write function is complete and updated to memory 22. If rendering order is not maintained, the result of processing the second read-modify-write function based on the data may be wrong.

In accordance with the disclosure, cache controller 18 implements techniques for locking and unlocking cache lines in cache 20 in response to batch read and write requests received from processing pipeline 16 while performing a read-modify-write function. Cache controller 18 receives a read request in a batch of read requests for data included in a section of a cache line in cache 20 and sets a lock bit associated with the section of the cache line in response to the read request. When the lock bit associated with that section of the cache line is set, additional read requests in the batch of read requests from processing pipeline 16 are unable to access data in that section of the cache line. Cache controller 18 may unset the lock bit in response to a write request in a batch of write requests received from processing pipeline 16 to update the data previously read out from the section of the cache line in cache 20. If cache controller 18 receives a read request from processing pipeline 16 for data included in the locked section of the cache line, cache controller 18 may hold the read request in a buffer (not shown) and cache 20 may process the held read request once the lock bit of the section is unset.

Implementing the cache line locking and unlocking techniques in cache controller 18 may improve performance of processing unit 14 and device 10 by reducing accesses to memory 22 relative to a conventional cache arrangement, which saves power and access bandwidth. For example, the techniques reduce or eliminate unnecessary cache line threshing in which a subsequent read request evicts a cache line before previously read out data included in the cache line can be updated. Locking the cache lines between read requests in the batch of read requests and associated write requests in the batch of write requests ensures that those cache lines including previously read out data will remain in cache 20 until the data is updated by a write request. In this way, the write requests to update data included in the cache lines trigger cache write hits in cache 20. Therefore, the processing unit 14 may not need to perform a hit or miss determination within cache 20 and may never need to fetch a cache line from memory 22 during a write process.

As another example, the cache line locking and unlocking techniques naturally assure that multiple read and write requests for the same data within a cache line are processed in the correct order. Locking access to the cache line ensures that a subsequent read request cannot be processed until a write request associated with a previous read request updates the data and unlocks the cache line. In this way, subsequent read requests for the same data will return accurate information to the processing pipeline 16.

In one aspect, processing unit 14 may comprise a GPU and processing pipeline 16 may comprise a GPU pipeline. As discussed in greater detail below, components within the GPU pipeline may be arranged in accordance with conventional GPU pipelines or may be rearranged relative to conventional GPU pipelines, which may improve the process of image processing. GPUs typically include a number of pipeline stages such as one or more shader stages, setup stages, rasterizer stages, and interpolation stages. At each of these stages, a GPU may utilize data stored in either an external memory or an embedded memory.

For example, after primitive shapes formed within the image data are converted into pixels by a rasterizer stage, a pixel depth comparison function may be performed to eliminate those portions of the primitive shapes that are hidden in an image frame. The pixel rejection may be performed based on a comparison between a depth value that has been interpolated for a given pixel and a recorded depth value corresponding to that pixel that is fetched from memory 22 via cache 20. If the comparison function returns true, which means that the interpolated depth value is less than (i.e., in front of) the recorded depth value, then the interpolated depth value of the pixel should be written to memory 22. If the function returns false, which means that the interpolated depth value is greater than (i.e., behind) the recorded depth value, the recorded depth value of the pixel should remain unchanged and processing of that pixel is halted immediately.

As another example, after attributes of primitives are interpolated over pixels within the primitives, a post processor may perform a color function with alpha blending to determine the resultant color at a pixel included in overlapping primitives. These read-modify-write functions typically trigger a pixel value read request from processing pipeline 16 to cache controller 18, followed by a pixel value write request from processing pipeline 16 to cache controller 18 for each pixel in the image frame. As described in more detail below, cache controller 18 locks the cache lines including the requested data between read requests in the batch of read requests and associated write requests in the batch of write requests. In this way, the cache line locking and unlocking techniques avoid unnecessary cache line threshing and ensure that overlapping primitives are processed in the correct order.

Figure 2:
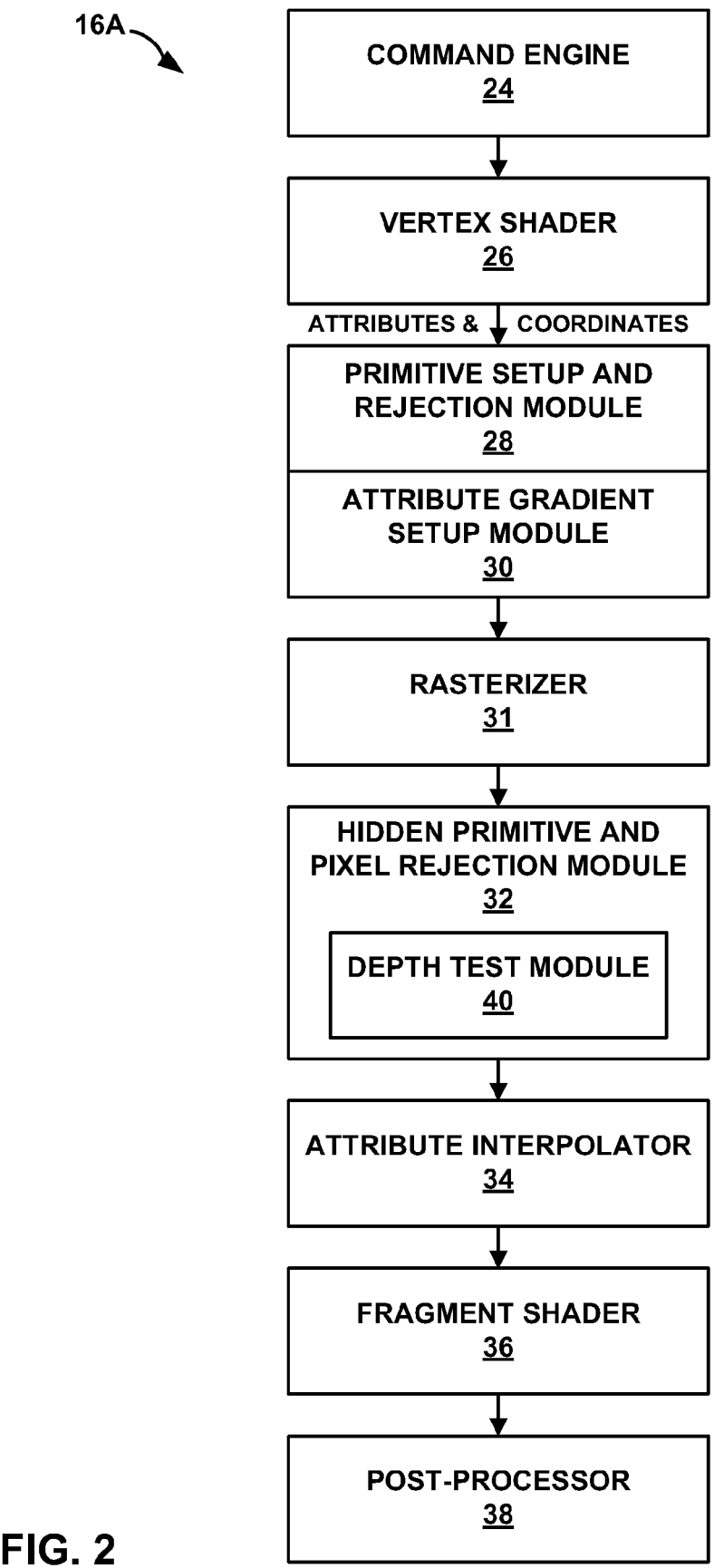
FIG. 2 is a block diagram illustrating an exemplary processing pipeline coupled to the cache via the cache controller from FIG. 1.

FIG. 2 is a block diagram illustrating an exemplary processing pipeline 16 from FIG. 1 as a conventional GPU pipeline 16A. In the illustrated example, GPU pipeline 16A includes a command engine 24, a vertex shader 26, a primitive setup and rejection module 28, an attribute gradient setup module 30, a rasterizer 31, a hidden primitive and pixel rejection module 32, an attribute interpolator 34, a fragment shader 36, and a post-processor 38. In addition, hidden primitive and pixel rejection module 32 includes a depth test module 40 that accesses cache 20 via cache controller 18 to perform a pixel depth comparison that determines which pixels are visible in an image scene.

Command engine 24 receives image geometry and rendering commands from device controller 12 of device 10. Command engine 24 passes the image geometry and rendering commands along GPU pipeline 16A to the other processing stages. Vertex shader 26 is applied to the image geometry and determines surface properties of the computerized image at vertices within the image geometry. In this way, vertex shader 26 generates vertex coordinates and attributes of each of the vertices within the image geometry. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry.

Primitive setup and rejection module 28 forms primitives with one or more vertices within the image geometry. Primitive setup and rejection module 28 may also reject primitives by performing scissoring and backface culling using the XY coordinates of the vertices within the primitives. Scissoring and backface culling reject primitives and portions of primitives from consideration during processing of a specific frame of the image when the primitives and the portions of primitives are invisible within the image frame.

Attribute gradient setup module 30 computes gradients of attributes associated with the primitives for the image geometry. Once the attribute gradient values are computed, rasterizer 31 converts primitives of the image geometry into pixels based on the XY coordinates of each of the vertices within the primitives and the number of pixels included in the primitives. Hidden primitive and pixel rejection module 32 rejects hidden primitives and hidden pixels within the primitives based on a pixel depth comparison function performed by depth test module 40. The pixel depth comparison function is based on the Z coordinate of the pixels within the primitives. Primitives or pixels within primitives may be considered hidden, and be rejected from consideration during processing of a specific frame of the image, when the primitives or the pixels within primitives are located behind another object within the image frame or are transparent within the image frame.

More specifically, depth test module 40 performs the pixel depth comparison function between a depth value that has been interpolated for a given pixel and a recorded depth value corresponding to that pixel that is fetched from memory 22 via cache 20. If depth test module 40 returns true, which means that the interpolated depth value is less than (i.e., in front of) the recorded depth value, then the interpolated depth value of the pixel should be written to memory 22. If depth test module 40 returns false, which means that the interpolated depth value is greater than (i.e., behind) the recorded depth value, the recorded depth value of the pixel should remain unchanged and processing of that pixel is halted immediately.

In performing the pixel depth comparison, depth test module 40 performs a read-modify-write function using batch read and write requests for pixel depth values stored in memory 22. Depth test module 40 typically triggers a batch of pixel depth value read requests to cache controller 18, followed by a batch of associated pixel depth value write requests to cache controller 18 for every pixel in the image frame. As described in more detail below, cache controller 18 locks the cache lines including the requested data between read requests in the batch of read requests and associated write requests in the batch of write requests. In this way, subsequent read requests from depth test module 40 or other components within processing pipeline 16 will not cause unnecessary cache line threshing or disordered processing of overlapping primitives.

Attribute interpolator 34 interpolates the attributes over pixels within the primitives based on the attribute gradient values. Attribute interpolator 34 may disregard attribute gradients of vertices associated with rejected primitives within the image geometry. The interpolated attribute values are then input to fragment shader 36 to perform pixel rendering of the primitives. Fragment shader 36 determines surface properties of the image at pixels within the primitives for the image geometry, and renders pixels of the primitives. Results of fragment shader 36 will be output to post-processor 38 for presentation of the processed computerized image on a display device.

Figure 3:
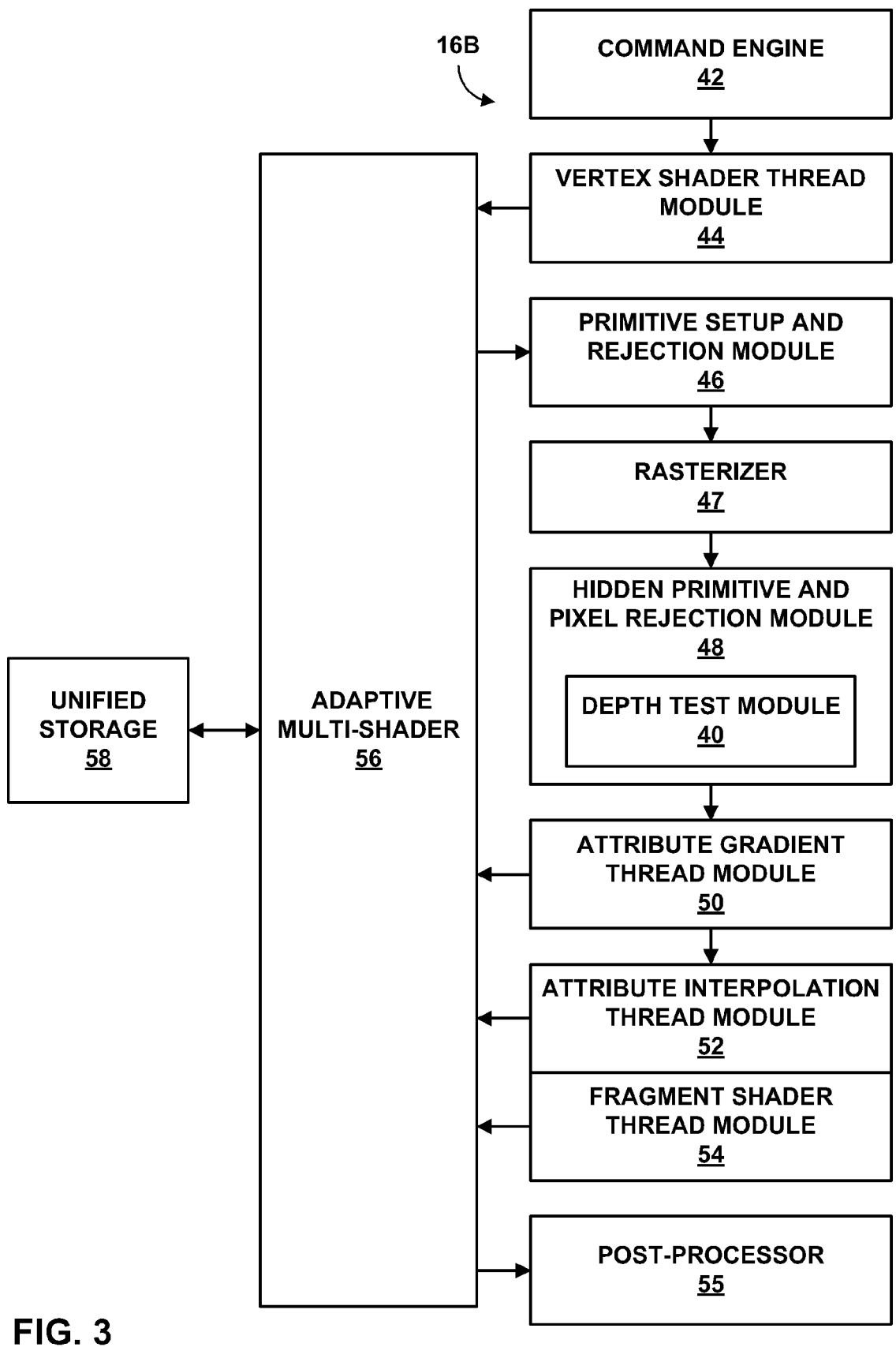
FIG. 3 is a block diagram illustrating another exemplary processing pipeline coupled to the cache via the cache controller from FIG. 1.

FIG. 3 is a block diagram illustrating another exemplary processing pipeline 16 from FIG. 1 as a GPU pipeline 16B coupled to an adaptive multi-shader 56 and a unified storage 58. In the illustrated example, GPU pipeline 16B includes a command engine 42, vertex shader thread module 44, a primitive setup and rejection module 46, a rasterizer 47, a hidden primitive and pixel rejection module 48, an attribute gradient thread module 50, an attribute interpolation thread module 52, fragment shader thread module 54, and a post-processor 56. In addition, hidden primitive and pixel rejection module 48 includes a depth test module 40 that accesses cache 20 via cache controller 18 to perform a pixel depth comparison that determines which pixels are visible in an image scene.

Adaptive multi-shader 56 combines shader cores for a vertex shader and a fragment shader. Adaptive multi-shader 56 may also combine shader cores for an attribute gradient setup module and an attribute interpolator. Adaptive multi-shader 56 receives streams of image data from components within GPU pipeline 16B for processing at each of the shader stages.

Command engine 42 receives image data and rendering commands from device controller 12 of device 10. Command engine 42 passes the image data along GPU pipeline 16B to vertex shader thread module 44. Vertex shader thread module 44 reads vertices from the image data and sends streams of vertex data to adaptive multi-shader 56. Adaptive multi-shader 56 performs vertex shading to determine surface properties of the image at the vertices within the image data. In this way, adaptive multi-shader 56 generates vertex coordinates and attributes of the vertices within the image data. Adaptive multi-shader 56 stores the processed vertex data in unified storage 58, which acts as a unified register file for adaptive multi-shader 56.

Primitive setup and rejection module 46 forms primitives with one or more vertices within the image data. Primitive setup and rejection module 46 may also reject primitives by performing scissoring and backface culling using the XY coordinates of the vertices within the image data. Rasterizer 47 converts the primitives of the image data into pixels based on the XY coordinates of vertices within the primitives and the number of pixels included in the primitives. Hidden primitive and pixel rejection module 48 rejects hidden primitives and hidden pixels within the primitives based on a pixel depth comparison function performed by depth test module 40. As described above, the pixel depth comparison function is based on the Z coordinate of the pixels within the primitives.

Depth test module 40 performs the pixel depth comparison function between a depth value that has been interpolated for a given pixel and a recorded depth value corresponding to that pixel that is fetched from memory 22 via cache 20. If depth test module 40 returns true, which means that the interpolated depth value is less than (i.e., in front of) the recorded depth value, then the interpolated depth value of the pixel should be written to memory 22. If depth test module 40 returns false, which means that the interpolated depth value is greater than (i.e., behind) the recorded depth value, the recorded depth value of the pixel should remain unchanged and processing of that pixel is halted immediately.

In performing the pixel depth comparison, depth test module 40 performs a read-modify-write function using batch read and write requests for pixel depth values stored in memory 22. Depth test module 40 typically triggers a batch of pixel depth value read requests to cache controller 18, followed by a batch of associated pixel depth value write requests to cache controller 18 for every pixel in the image frame. As described in more detail below, cache controller 18 locks the cache lines including the requested data between read requests in the batch of read requests and associated write requests in the batch of write requests. In this way, subsequent read requests from depth test module 40 or other components within processing pipeline 16 will not cause unnecessary cache line threshing or disordered processing of overlapping primitives.

Attribute gradient thread module 50 sends streams of primitive data to adaptive multi-shader 56 to prompt adaptive multi-shader 56 to perform attribute gradient setup. The primitive data may indicate primitives for the image data. Adaptive multi-shader 56 stores the primitive data in unified storage 58. Adaptive multi-shader 56 retrieves the vertex attributes of each of the vertices within primitives for the image data from unified storage 58. Adaptive multi-shader 56 computes gradients of attributes associated with the primitives for the image data.

Attribute interpolation thread module 52 forms a stream of pixel data for each of the primitives not rejected by primitive setup and rejection module 46 or hidden primitive and pixel rejection module 48. Once the attribute gradient values are computed, attribute interpolation thread module 52 sends streams of pixel data to adaptive multi-shader 56 to prompt adaptive multi-shader 56 to perform attribute interpolation and pixel rendering. The pixel data may indicate pixels within the primitives for the image data. Adaptive multi-shader 56 stores the pixel data in unified storage 58. Adaptive multi-shader 56 interpolates the attributes over the pixels within the primitives based on the attribute gradient values.

Fragment shader module 54 reads pixels from the image data and sends streams of pixel data to adaptive multi-shader 56. Adaptive multi-shader 56 performs fragment shading to determine surface properties of the computerized image at the pixels within the primitives for the image data. In this way, adaptive multi-shader 56 renders pixels of the primitives based on the interpolated attribute values. Adaptive multi-shader 56 stores the processed pixel data in unified storage 58. Results of adaptive multi-shader 56 will be output to a post-processor 55 for presentation of the processed image on a display.

In other aspects a GPU pipeline may includes different components than those illustrated in FIGS. 2 and 3 or the components within GPU pipelines 16A and 16B may be arranged in a different fashion. In additional aspects, processing pipeline 16 may comprise one of a CPU pipeline, a video processing pipeline, a still-image processing pipeline, an audio processing pipeline, or any other processing pipeline capable of processing image data and/or audio data.

Figure 4:
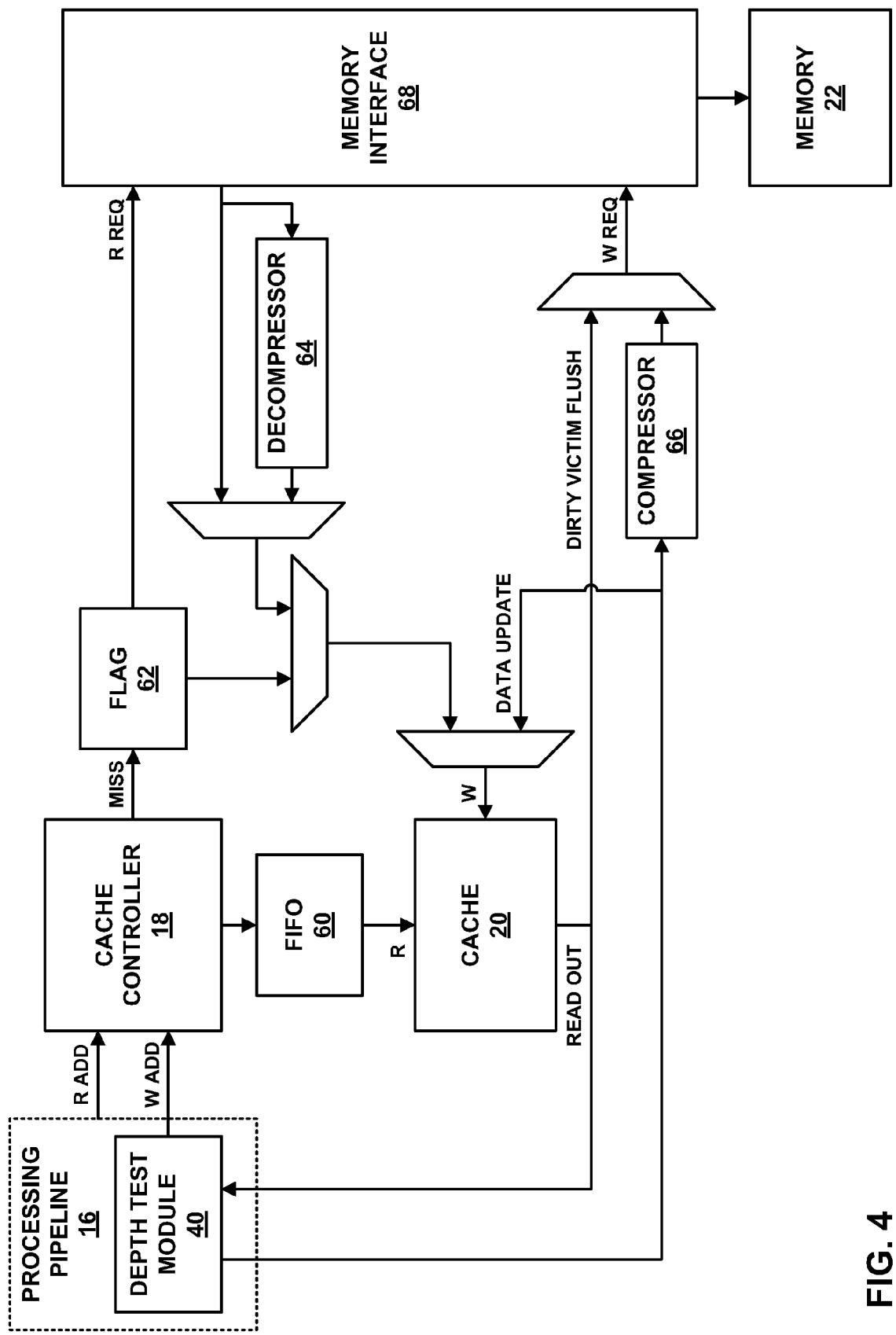
FIG. 4 is a block diagram illustrating the processing unit from FIG. 1 in greater detail.

FIG. 4 is a block diagram illustrating processing unit 14 from FIG. 1 in greater detail. In the illustrated example, processing pipeline 16 comprises a GPU pipeline that includes depth test module 40, as described in FIGS. 2 and 3. Cache controller 18 receives a read request in a batch of read requests from processing pipeline 16 for a recorded depth value of a pixel at a memory location in memory 22. As described above, depth test module 40 may request a recorded depth value of a given pixel stored at a memory location in memory 22 in order to perform a pixel depth comparison function to determine whether an interpolated depth value of that pixel is visible within a video scene.

Upon receiving the read request, cache controller 18 first determines whether the requested data is currently stored at a cache location in cache 20. In one aspect, cache 20 may comprise a set associative cache in which each memory location in memory 22 is assigned a set of cache locations in cache 20 at which the content of the memory location may be stored. In this case, cache controller 18 identifies a set of potential cache locations in cache 20 that are assigned to store the content of the memory location. Cache controller 18 then searches the cache lines at each of the potential cache locations in the cache set for an address tag associated with the memory location. For example, cache 20 may comprise a 4-way set associative cache such that cache controller 18 searches the cache line at each of the four cache locations assigned to store the content of the memory location. In another aspect, cache 20 may comprise a direct mapped cache such that cache controller 18 only searches the cache line at the one cache location assigned to store the content of the memory location.

If the requested pixel depth value is not currently stored in cache 20, the read request triggers a cache read miss. Cache controller 18 first selects one of the unlocked cache lines from the cache set and sets the address tag of the selected cache line to the address tag associated with the memory location in memory 22 that includes the requested data. Cache controller 18 also sets the lock bit of the section in the cache line that will include the requested data. Cache controller 18 then forwards the read request to flag module 62, which forwards the read request to a memory interface 68. Memory interface 68 communicates with memory 22 to retrieve content of the memory location that includes the requested pixel depth value. Memory interface 68 then sends the content of the memory location through decompressor 64 and stores the content of the memory location within a cache line at an assigned cache location in cache 20. Cache 20 reads out the requested pixel depth value from the section of the cache line back to depth test module 40 within processing pipeline 16.

In some cases, cache lines at all of the potential cache locations assigned to store the content of the memory location may be locked. Since cache controller 18 cannot evict one of the locked cache lines in cache 20 to store the requested pixel depth value, cache controller 18 holds the read request until the lock bit of the section is unset. The read process is then stalled, and cache controller 18 may begin a write process.

If the requested pixel depth value is currently stored in cache 20, the read request triggers a cache read hit. In this case, cache controller 18 identifies a section of the cache line that includes the requested pixel depth value and then determines whether a lock bit of the section is set in the cache line. As described in more detail below with reference to FIG. 5C, a cache line includes multiple lock bits associated with respective sections of the cache line. A section of the cache line is locked to accesses by additional read requests when its associated lock bit is set to a value of one. A section of the cache line is unlocked to access by read requests when its associated lock bit is unset to a value of zero.

When cache controller 18 determines that the lock bit associated with the section that includes the requested pixel depth value is not set, cache controller 18 sets the lock bit of the section in the cache line that includes the requests pixel depth value. Cache controller 18 then sends the read request through FIFO 60 to cache 20. Cache 20 reads out the requested pixel depth value from the section of the cache line back to depth test module 40 within processing pipeline 16. In this way, cache controller 18 is able to lock the section of the cache line to accesses by additional read requests in the batch of read requests until after a write request updates the requested pixel depth value and unsets the lock bit.

When cache controller 18 determines that the lock bit associated with the section that includes the requested pixel depth value is set, cache controller 18 holds the read request in FIFO 60 until the lock bit of the section in the cache line is unset. In this way, cache controller 18 is able to maintain the read request in the buffer without the possibility of threshing the cache-line that includes the previously read out pixel depth value waiting to be updated. The read process is then stalled, and cache controller 18 may begin a write process.

After performing the pixel depth comparison function, described in more detail in FIGS. 2 and 3, depth test module 40 may request an update of the previously read out pixel depth value stored at the memory location in memory 22. As described above, a write request in the batch of write requests to update a pixel depth value always follows a read request in the batch of read requests for the pixel depth value. The cache line locking and unlocking techniques described herein eliminate the possibility of a subsequent read request in the batch of read requests threshing out the cache line that includes the requested data. Therefore, the cache line locking and unlocking techniques ensure that the cache line from which the requested pixel depth value was previously read out is still stored at the same cache location in cache 20. In this way, the write request from depth test module 40 will trigger a cache write hit within cache 20.

Upon receiving the write request, cache controller 18 determines whether the data previously read out from the section of the cache line needs to be updated in cache 20. If the previously read out data does not need to be updated then cache controller 18 unsets the lock bit of the section in the cache line in order to unlock the section. For example, if depth test module 40 returns false, which means that the interpolated depth value is greater than (i.e., behind) the recorded depth value, the recorded depth value of the pixel should remain unchanged in cache 20 and memory 22, and processing of that pixel is halted immediately.

If the previously read out data needs to be updated then cache 20 updates the requested data in the section of the cache line. For example, if depth test module 40 returns true, which means that the interpolated depth value is less than (i.e., in front of) the recorded depth value, then the interpolated depth value of the pixel should be written to cache 20 and memory 22. In some aspects, depth test module 40 also sends the write request with the updated pixel depth value to a compressor 66, which forwards the write request to memory interface 68. Memory interface 68 then communicates with memory 22 to update the requested pixel depth value in the memory location. In other aspects, the requested pixel depth value may not be immediately updated to the memory location in memory 22. Cache controller 18 then sets the dirty bit of the cache line to signify that the content of the cache line is different than the content of the associated memory location in memory 22. Memory 22 may be updated at a later time based on the updated value in cache 20. After cache 20 updates the data in the section of the cache line, cache controller 18 unsets the lock bit of the section in the cache line in order to unlock the section.

Once the section of the cache line in cache 20 that included the requested pixel depth value is unlocked, cache controller 18 may return to any held read requests for that section of the cache line. If a held read request for a pixel depth value included in that section of the cache line is in FIFO 60, cache controller 18 and cache 20 may perform the held read request in a substantially similar manner as the other read requests described above.

Figure 5A:
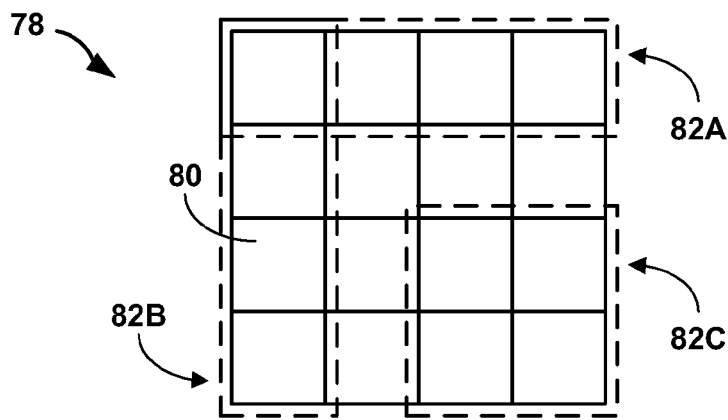
FIGS. 5A-5C illustrate exemplary storage of a cache-line in the cache.
Figure 5B:
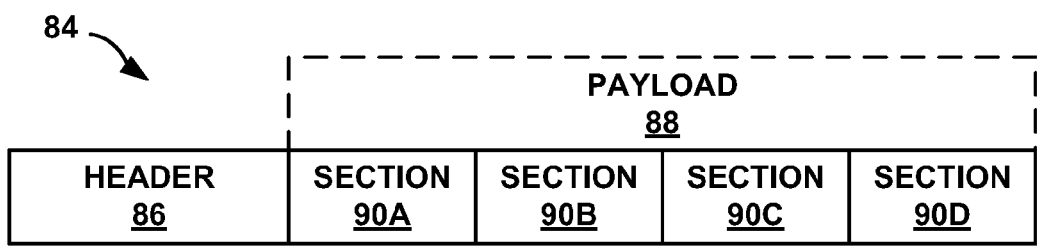
Figure 5C:
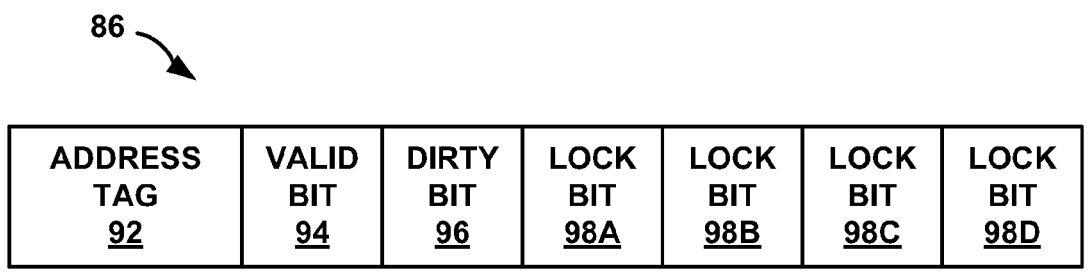

FIGS. 5A-5C illustrate exemplary storage of a cache-line in cache 20 from FIG. 1. FIG. 5A illustrates exemplary data at a memory location of memory 22 stored within a cache line in cache 20. The data comprises a pixel tile 78 that includes a plurality of individual pixels 80. In the aspect in which cache 20 is included within a GPU, described in more detail above, pixel tile 78 may comprise a portion of a primitive for the image data. Pixel tile 78 may be partitioned and stored in a multiple sections of a cache line in cache 20. For example, pixel tile 78 may be partitioned into rows 82A or columns 82B of pixels 80. As another example, pixel tile 78 may be partitioned into quadrants 82C of pixels 80. In the example illustrated in FIG. 5A, pixel tile 78 comprises a 4×4 block of pixels 80 partitioned into four pixel sections. In other examples, pixel tile 78 may comprise a larger or smaller block of pixels and may partition the block of pixels into different sized sections, such as single pixels.

FIG. 5B illustrates an exemplary structure of a cache line 84 in cache 20. Cache line 84 includes a header 86 and a payload 88 partitioned into sections 90A-90D. Each of sections 90A-90D may store one of the pixel sections of partitioned pixel tile 78 from FIG. 5A. For example, each of sections 90A-90D within payload 88 may store four pixels of the 4×4 pixel tile 78. FIG. 5C illustrates an exemplary structure of header 86 within cache line 84 from FIG. 5B. Header 86 includes an address tag 92 associated with the memory location in memory 22 that stores the data included in payload 88 of cache line 84. Header 86 also includes a valid bit 94, a dirty bit 96, and lock bits 98A-98D.

Valid bit 94 is set when the data stored in cache line 84 has been updated at the memory location in memory 22 such that the data within cache line 84 in cache 20 is equivalent to the data at the memory location in memory 22. Dirty bit 96 is set when data stored in cache line 84 has been updated at the memory location in memory 22 such that the data within cache line 84 in cache 20 is different than the data at the memory location in memory 22.

Each of lock bits 98A-98D is associated with a respective one of sections 90A-90D of payload 88. In order to lock section 90A, for example, upon receipt of a read request for data included in section 90A of cache line 84, cache controller 18 sets lock bit 98A in header 86 to a value of one. In order to unlock section 90A upon receipt of a write request to update the data included in section 90A, cache controller 18 unsets lock bit 98A to a value of zero. In this way, one or more of sections 90A-90D may be locked by setting the associated one or more of lock bits 98A-98D, while the remaining sections 90A-90D are available for read access. This allows the previously read out data included in some of sections 90A-90D to be protected from threshing until the data is updated, without locking the entire cache line 84 to accesses by other read requests.

Figure 6:
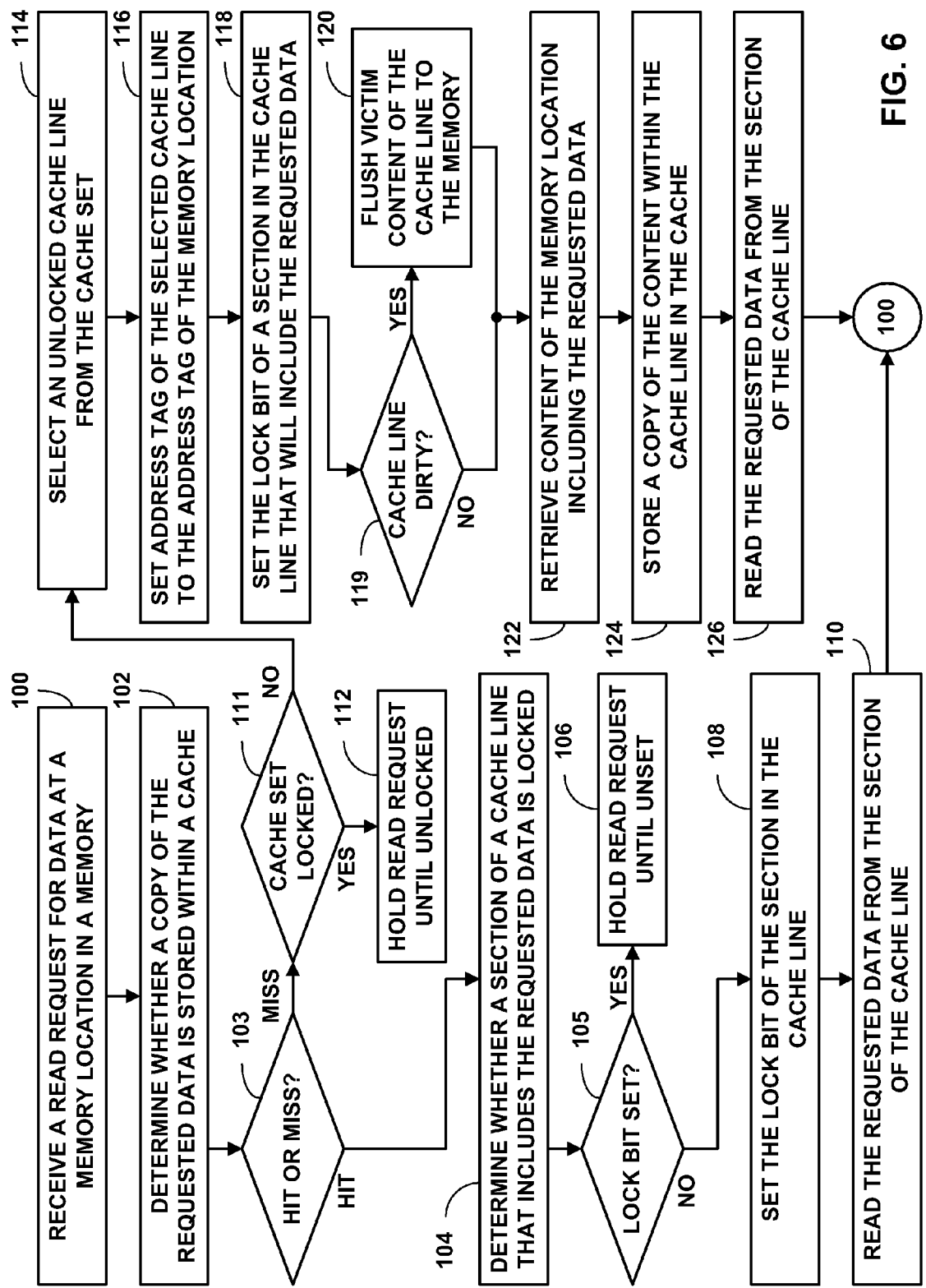
FIG. 6 is a flowchart illustrating an exemplary operation of the cache controller processing a read request from the processing pipeline.

FIG. 6 is a flowchart illustrating an exemplary operation of cache controller 18 processing a read request in a batch of read requests from processing pipeline 16. Processing pipeline 16 performs read-modify-write functions using batch read and write requests for data stored in memory 22. The operation illustrated in FIG. 6 will be described in reference to cache controller 18 and cache 20 from FIGS. 1 and 4.

Cache controller 18 receives a read request in a batch of read requests for a data at a memory location in memory 22 (100). The batch of read requests may be sent for a component within processing pipeline 16. For example, the batch of read requests may be sent to cache controller 18 for depth test module 40 within processing pipeline 16. As described above, depth test module 40 may request a recorded depth value of a given pixel stored at a memory location in memory 22 in order to perform a pixel depth comparison function to determine whether an interpolated depth value of that pixel is visible within a video scene.

Cache controller 18 determines whether a copy of the requested data is currently stored at a cache location in cache 20 (102). As described above, cache 20 may comprise a set associative cache. In this case, cache controller 18 identifies a set of potential cache locations in cache 20 that are assigned to store the memory location, and searches the cache lines at each of the potential cache locations in the cache set for an address tag associated with the memory location. In another aspect, cache 20 may comprise a direct mapped cache such that cache controller 18 only searches the cache line at the one cache location assigned to store the memory location.

Cache controller 18 determines that a copy of the requested data is not currently stored in cache 20 upon not finding the address tag associated with the memory location that includes the requested data in the cache lines at any of the potential cache locations in the cache set. If the requested data is not currently stored at a cache location in cache 20 (MISS branch of 103), a read of the requested data at the memory location in memory 22 is triggered. In this case, cache controller 18 searches for a cache location within cache 20 at which to store a copy of the content of the memory location that includes the requested data. If the cache lines at all the potential cache locations in the cache set have at least one section locked (YES branch of 111), then cache controller 18 holds the read request until at least one of the cache lines is unlocked by a write request (112).

If at least one of the cache lines at the potential cache locations in the cache set are unlocked (NO branch of 111), cache controller 18 selects one of the unlocked cache lines from the cache set (114). Cache controller 18 then sets the address tag of the selected cache line to the address tag associated with the memory location in memory 22 that includes the requested data (116). Cache controller 18 also sets the lock bit of the section in the cache line that will include the requested data (118). If the victim content of the cache line is dirty (YES branch of 119), cache 20 flushes the victim content of the cache line to memory 22. Once the victim content of the cache line has been updated in memory 22 or if the victim content of the cache line was already up-to-date in memory 22, cache controller 18 retrieves the content of the memory location including the requested data from memory 22 (122) and stores a copy of the content within the cache line in cache 20 (124). Cache 20 reads the requested data from the section of the cache line (126). Cache controller 18 then receives another read request in the batch of read requests for data at a memory location in memory 22 (100). The read process continues until all of the read requests in the batch of read requests have been processed or until cache controller 18 receives a read request for data stored in a locked section of a cache line in cache 20.

Cache controller 18 determines that a copy of the requested data is currently stored in cache 20 upon finding the address tag associated with the memory location that includes the requested data in a cache line at one of the potential cache locations in the cache set. If the requested data is currently stored at a cache location in cache 20 (HIT branch of 103), cache controller 18 determines whether a section of the cache line that includes the requested data is locked (104). If the lock bit of the section is set such that the section is locked (YES branch of 105), cache controller 18 holds the read request until the lock bit of the section in the cache line that includes the requested data is unset by a write request (106). For example, cache controller 18 may hold the read request in a buffer, such as FIFO 60 from FIG. 4. In this way, cache controller 18 is able to maintain the read request without the possibility of threshing the cache line that includes the previously read out data waiting to be updated.

If the lock bit of the section is not set such that the section is not locked (NO branch of 105), cache controller 18 sets the lock bit of the section in the cache line (108). Cache 20 then reads the requested data from the section of the cache line (110). In this way, cache controller 18 is able to lock the section of the cache line to accesses by additional read requests in the batch of read requests until after a write request updates the requested data and unsets the lock bit. Cache controller 18 then receives another read request in the batch of read requests for data at a memory location in memory 22 (100). The read process continues until all of the read requests in the batch of read requests have been processed or until cache controller 18 receives a read request for data stored in a locked section of a cache line in cache 20.

Figure 7:
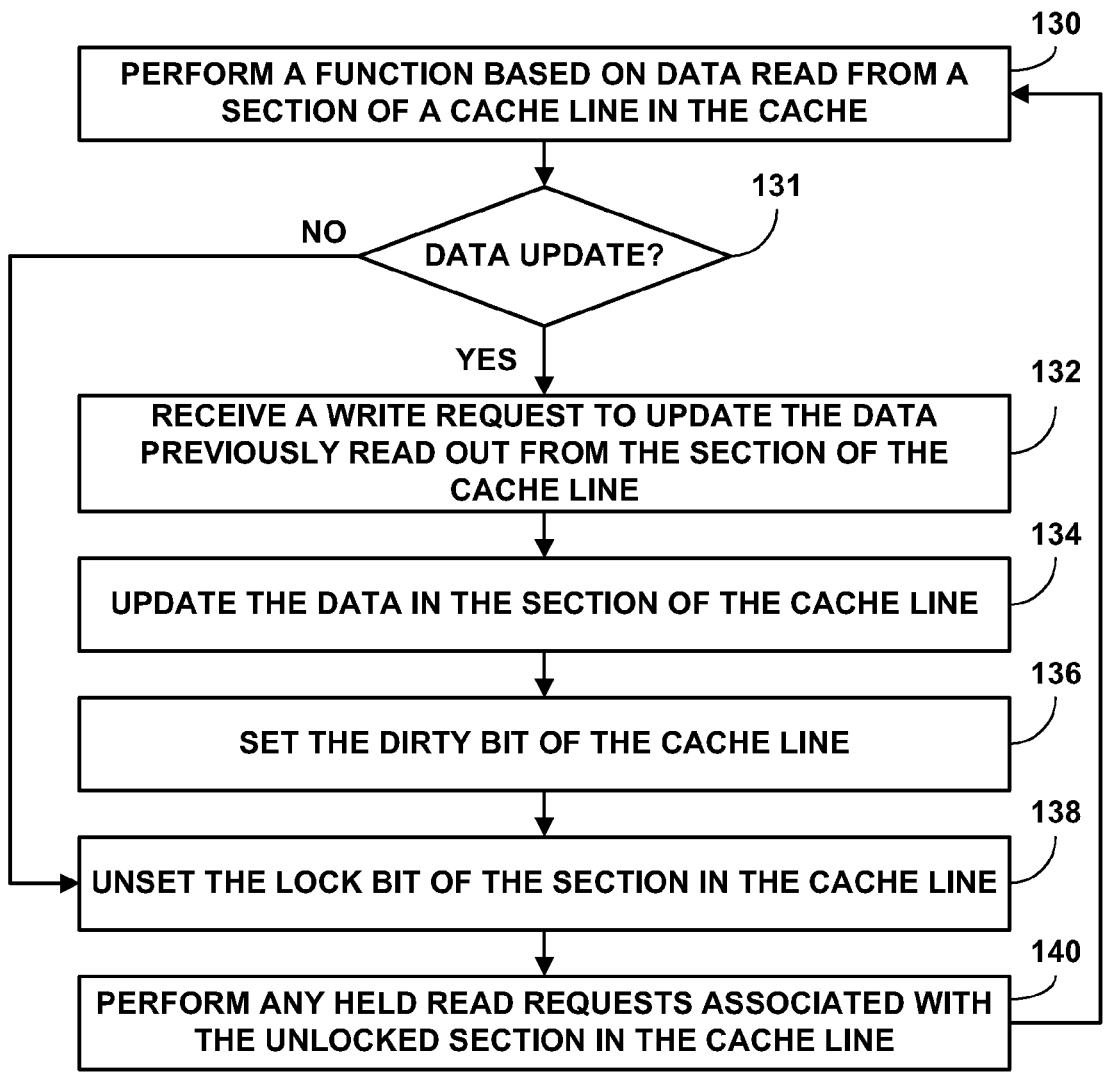
FIG. 7 is a flowchart illustrating an exemplary operation of the cache controller processing a write request from the processing pipeline.

FIG. 7 is a flowchart illustrating an exemplary operation of cache controller 18 processing a write request in a batch of write requests from processing pipeline 16. Processing pipeline 16 performs read-modify-write functions using batch read and write requests for data stored in memory 22. The operation illustrated in FIG. 7 will be described in reference to cache controller 18 and cache 20 from FIGS. 1 and 4.

Processing pipeline 16 performs a function based on data read from a section of a cache line in cache 20 (130). For example, as described above, processing pipeline 16 may comprise a GPU that includes a pixel depth test module 40 that performs a pixel depth comparison function. Depth test module 40 performs the pixel depth comparison function between a depth value that has been interpolated for a given pixel and a recorded depth value corresponding to that pixel that is fetched from memory 22 via cache 20.

After processing pipeline 16 performs the function, cache controller 18 determines whether the data previously read out from the section of the cache line needs to be updated in cache 20 (131). If the previously read out data does not need to be updated (NO branch of 131), cache controller 18 unsets the lock bit of the section in the cache line in order to unlock the section (138). For example, if depth test module 40 returns false, which means that the interpolated depth value is greater than (i.e., behind) the recorded depth value, the recorded depth value of the pixel should remain unchanged in cache 20 and memory 22, and processing of that pixel is halted immediately.

If the previously read out data needs to be updated (YES branch of 131), cache controller 18 receives a write request in a batch of write requests to update the data previously read out from the section of the cache line in cache 20 (132). A write request in a batch of write requests to update specific data at a memory location always follows a read request in a batch of read requests for the data at the memory location. The cache line locking and unlocking techniques described herein eliminate the possibility of a subsequent read request threshing out, or overwriting, the cache line that includes the requested data. Therefore, the cache line locking and unlocking techniques ensure that the cache line from which the requested data was previously read out is still stored at the same cache location in cache 20. In this way, the write request to update the previously read out data will trigger a cache write hit within cache 20.

Upon receiving the write request in the batch of write requests, cache 20 updates the requested data in the section of the cache line (134). For example, if depth test module 40 returns true, which means that the interpolated depth value is less than (i.e., in front of) the recorded depth value, then the interpolated depth value of the pixel should be written to cache 20 and memory 22. Cache controller 18 then sets the dirty bit of the cache line to signify that the content of the cache line is different than the content of the associated memory location in memory 22 (136). Cache controller 18 unsets the lock bit of the section in the cache line in order to unlock the section (138).

Once the section of the cache line in cache 20 that includes the previously read out data has been unlocked, cache controller 18 may perform any held read requests associated with the unlocked section in the cache line (140). As described above, cache controller 18 may hold read requests in a buffer, such as FIFO 60 from FIG. 4, when the data requested by the read requests are included in locked sections of cache lines in cache 20. In this way, cache controller 18 is able to maintain read requests in the batch of read requests without the possibility of threshing cache lines that include previously read out data waiting to be updated. The held read requests may be performed in a substantially similar manner as described in FIG. 6.

Processing pipeline 16 continues to perform the function based on data read from a section of a cache line in cache 20 (130), and cache controller 18 determines whether to update the data previously read out from the section of the cache line in cache 20 and memory 22 (131). The write process continues until all of the write requests in the batch of write requests have been processed.

The techniques of this disclosure are directed to locking and unlocking cache lines in a cache included within a multi-media processor. The techniques may be used by processors that perform read-modify-write functions using batch read and write requests for data stored in either an external memory or an embedded memory. The techniques described herein may comprise receiving a read request in a batch of read requests for data included in a section of a cache line and setting a lock bit associated with the section of the cache line in response to the read request. When the lock bit associated with the section of the cache line is set, additional read requests in the batch of read requests are unable to access data included in that section of the cache line. The lock bit may be unset in response to a write request in a set of write requests to update the data previously read out from that section of the cache line. If a read request for data included in the locked section of the cache line is received, the read request may be held in a buffer and processed once the lock bit of the section is unset.

The cache line locking and unlocking techniques may improve performance of the multi-media processor by reducing accesses to a memory (e.g., external or embedded) relative to a conventional cache arrangement, which saves additional power and access bandwidth. For example, the techniques reduce or eliminate unnecessary cache line threshing in which a subsequent read request evicts a cache line before previously read out data included in the cache line can be updated. Locking the cache lines between read requests in the batch of read requests and associated write requests in the batch of write requests ensures that those cache lines including previously read out data will remain in the cache until the data is updated by a write request. In this way, the write requests to update data included in the cache lines trigger cache write hits. Therefore, the multi-media processor may not need to perform a hit or miss determination within the cache and may not need to fetch a cache line from the memory during a write process.

As another example, the cache line locking and unlocking techniques naturally assure that multiple read and write requests for the same data within a cache line are processed in the correct order. Locking access to the cache line ensures that a subsequent read request cannot be processed until a write request associated with a previous read request updates the data and unlocks the cache line. In this way, subsequent read requests for the same data will return accurate information to the multi-media processor.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer. In some cases, the computer readable medium may be included in a computer program product, which may include packaging materials.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry.

Nevertheless, various modifications may be made to the techniques described without departing from the scope of the following claims.

The invention claimed is:

1. A method comprising:
receiving a batch of read requests from a processing pipeline for read-modify-write functions, wherein the batch comprises a plurality of read requests and each read request requests data at a memory location in a memory, and wherein the batch of read requests originates from the processing pipeline;
sequentially processing each read request in the batch of read requests, wherein processing each read request includes:
identifying a cache line in a cache storing a copy of the data requested by a respective read request in the batch of read requests,
determining whether the cache line is locked,
when the cache line is not locked, processing the read request and locking the cache line to accesses by additional read requests in the batch of read requests, and
when the cache line is locked, holding the read request until the cache line is unlocked; and
after the batch of read requests is processed, processing a corresponding batch of write requests for the read-modify-write functions.

2. The method of claim 1, wherein identifying a cache line storing the requested data comprises identifying a section of the cache line that includes the requested data, wherein the section of the cache line comprises less than the entirety of the cache line.

3. The method of claim 1, wherein determining whether the cache line is locked comprises determining whether a lock bit associated with a section of the cache line that includes the requested data is set, wherein the section of the cache line comprises less than the entirety of the cache line.

4. The method of claim 1, wherein locking the cache line to accesses by additional read requests in the batch of read requests comprises setting a lock bit associated with a section of the cache line that includes the requested data, wherein the section of the cache line comprises less than the entirety of the cache line.

5. The method of claim 1, further comprising:
receiving the batch of write requests from the processing pipeline for the read-modify-write functions, wherein each write request requests to update data previously read out from the cache, and wherein the batch of write requests originates from the processing pipeline; and
sequentially processing each write request in the batch of write requests, wherein processing each write request includes:
identifying a cache line in the cache storing a copy of the data requested for update by a respective write request in the batch of write requests,
unlocking the cache line, and
processing the write request.

6. The method of claim 5, wherein unlocking the cache line comprises unsetting a lock bit associated with a section of the cache line that includes the requested data, wherein the section of the cache line comprises less than the entirety of the cache line.

7. The method of claim 5, further comprising, after unlocking the cache line, processing the held read request and locking the cache line to accesses by additional read requests in a subsequent batch of read requests.

8. The method of claim 1, wherein identifying a cache line storing the requested data comprises:
identifying a set of potential cache locations in the cache assigned to store the requested data; and
determining whether the requested data is stored at one of the potential cache locations.

9. The method of claim 8, wherein determining whether the requested data is stored at one of the potential cache locations comprises:
searching cache lines at the potential cache locations for an address tag associated with the memory location that includes the requested data; and
upon finding the address tag associated with the memory location, identifying the one of the cache lines that includes the address tag as storing the requested data.

10. The method of claim 8, wherein determining whether the requested data is stored at one of the potential cache locations comprises:
searching cache lines at the potential cache locations for an address tag associated with the memory location that includes the requested data;
upon not finding the address tag associated with the memory location, retrieving content of the memory location from the memory;
storing the content of the memory location within a cache line at one of the potential cache locations; and
identifying the cache line as storing the requested data.

11. The method of claim 1, wherein receiving a batch of read requests from a processing pipeline for a read-modify-write function comprises receiving a batch of read requests from a hidden primitive and pixel rejection module within a graphics processing unit (GPU) pipeline for a pixel depth comparison function.

12. A processing unit comprising:
a cache including cache lines that store copies of content of memory locations of a memory;
a processing pipeline that sends a batch of read requests for read-modify-write functions, wherein the batch comprises a plurality of read requests and each read request requests data at a memory location in the memory, and wherein the batch of read requests originates from the processing pipeline; and
a cache controller coupled to the processing pipeline and the cache that sequentially processes each read request in the batch of read requests, wherein, to process each read request, the cache controller identifies a cache line in the cache storing a copy of the data requested by a respective read request in the batch of read requests, and determines whether the cache line is locked, wherein, when the cache line is not locked, the cache processes the read request and the cache controller locks the cache line to accesses by additional read requests in the batch of read requests, and wherein, when the cache line is locked, the cache controller holds the read request until the cache line is unlocked, and wherein, after the batch of read requests is processed, the cache controller processes a corresponding batch of write requests for the read-modify-write functions.

13. The processing unit of claim 12, wherein the cache controller identifies a section of the cache line that includes the requested data, wherein the section of the cache line comprises less than the entirety of the cache line.

14. The processing unit of claim 12, wherein the cache controller determines whether a lock bit associated with a section of the cache line that includes the requested data is set to determine whether the cache line is locked, wherein the section of the cache line comprises less than the entirety of the cache line.

15. The processing unit of claim 14, wherein the cache line includes multiple lock bits, and each lock bit is associated with a section of the cache line.

16. The processing unit of claim 12, wherein the cache controller sets a lock bit associated with a section of the cache line that includes the requested data to lock the cache line to accesses by additional read requests in the batch of read requests, wherein the section of the cache line comprises less than the entirety of the cache line.

17. The processing unit of claim 12, wherein:
the processing unit sends the batch of write requests for the read-modify-write functions, wherein each write request requests to update data previously read out from the cache, and wherein the batch of write requests originates from the processing pipeline;
the cache controller sequentially processes each write request in the batch of write requests, wherein, to process each write request, the cache controller identifies a cache line in the cache storing a copy of the data requested for update by a respective write request in the batch of write requests, and unlocks the cache line; and
the cache processes the write request.

18. The processing unit of claim 17, wherein the cache controller unsets a lock bit associated with a section of the cache line that includes the requested data to unlock the cache line, wherein the section of the cache line comprises less than the entirety of the cache line.

19. The processing unit of claim 17, wherein, after the cache controller unlocks the cache line, the cache processes the held read request and the cache controller locks the cache line to accesses by additional read requests in a subsequent batch of read requests.

20. The processing unit of claim 12, wherein the cache controller:
identifies a set of potential cache locations in the cache assigned to store the requested data; and
determines whether the requested data is stored at one of the potential cache locations.

21. The processing unit of claim 20, wherein the cache controller:
searches cache lines at the potential cache locations for an address tag associated with the memory location that includes the requested data; and
upon finding the address tag associated with the memory location, identifies the one of the cache lines that includes the address tag as storing the requested data.

22. The processing unit of claim 20, wherein the cache controller:
searches cache lines at the potential cache locations for an address tag associated with the memory location that includes the requested data;
upon not finding the address tag associated with the memory location, retrieves content of the memory location from the memory;
stores the content of the memory location within a cache line at one of the potential cache locations; and
identifies the cache line as storing the requested data.

23. The processing unit of claim 12, wherein the processing pipeline that sends a batch of read requests for a read-modify-write function comprises a graphics processing unit (GPU) pipeline that sends a batch of read requests for a pixel depth comparison function from a hidden primitive and pixel rejection module within the GPU pipeline.

24. A non-transitory computer-readable medium comprising instructions that cause a computer to:
receive a batch of read requests from a processing pipeline for a read-modify-write functions, wherein the batch comprises a plurality of read requests and each read request requests data at a memory location in a memory, and wherein the batch of read requests originates from the processing pipeline;
sequentially process each read request in the batch of read requests, wherein the instructions to process each read request include instructions that cause the computer to:
identify a cache line in a cache storing a copy of the data requested by a respective read request in the batch of read requests,
determine whether the cache line is locked,
when the cache line is not locked, process the read request and lock the cache line to accesses by additional read requests in the batch of read requests, and
when the cache line is locked, hold the read request until the cache line is unlocked; and
after the batch of read requests is processed, process a corresponding batch of write requests for the read-modify-write functions.

25. An apparatus comprising:
means for caching content of memory locations of a memory;
means for sending a batch of read requests from a processing pipeline for read-modify-write functions, wherein the batch comprises a plurality of read requests and each read request requests data at a memory location in the memory, and wherein the batch of read requests originates from the processing pipeline; and
means for controlling the means for caching by sequentially processing each read request in the batch of read requests, wherein processing each read request includes identifying a cache line in the means for caching that stores a copy of the data requested by a respective read request in the batch of read requests, and determining whether the cache line is locked,
wherein, when the cache line is not locked, the means for caching processes the read request and the means for controlling locks the cache line to accesses by additional read requests in the batch of read requests, and
wherein, when the cache line is locked, the means for controlling holds the read request until the cache line is unlocked, and
wherein, after the batch of read requests is processed, the means for controlling processes a corresponding batch of write requests for the read-modify-write functions.

* * * * *